United States Patent

Ovshinsky et al.

[11] Patent Number: 5,840,440
[45] Date of Patent: Nov. 24, 1998

[54] HYDROGEN STORAGE MATERIALS HAVING A HIGH DENSITY OF NON-CONVENTIONAL USEABLE HYDROGEN STORING SITES

[75] Inventors: Stanford R. Ovshinsky, Bloomfield Hills; Michael A. Fetcenko, Rochester Hills; Jun Su Im, Sterling Heights; Kwo Young; Benjamin S. Chao, both of Troy; Benjamin Reichman, West Bloomfield, all of Mich.

[73] Assignee: Ovonic Battery Company, Inc., Troy, Mich.

[21] Appl. No.: 560,612

[22] Filed: Nov. 20, 1995

[51] Int. Cl.⁶ .................................................. H01M 10/34
[52] U.S. Cl. .............................. 429/60; 429/59; 429/101; 429/218; 420/900; 420/417; 420/421; 420/422; 204/293
[58] Field of Search .................................... 420/900, 422, 420/417, 421; 429/218, 59, 101, 60; 204/293

[56] References Cited

U.S. PATENT DOCUMENTS

| | | | |
|---|---|---|---|
| 5,135,589 | 8/1992 | Fetcenko et al. | 420/900 |
| 5,277,999 | 1/1994 | Ovshinsky et al. | 420/900 |
| 5,330,861 | 7/1994 | Fetcenko et al. | 420/900 |
| 5,506,069 | 4/1996 | Ovshinsky et al. | 420/900 |
| 5,616,432 | 4/1997 | Ovshinsky et al. | 420/900 |
| 5,626,691 | 5/1997 | Li et al. | 420/421 |

*Primary Examiner*—Bruce F. Bell
*Attorney, Agent, or Firm*—David W. Schumaker; Marvin S. Siskind; Marc J. Luddy

[57] ABSTRACT

Disordered multicomponent hydrogen storage material characterized by extraordinarily high storage capacity due to a high density of useable hydrogen storage sites (greater than $10^{23}$ defect sites/cc) and/or an extremely small crystallite size. The hydrogen storage material can be employed for electrochemical, fuel cell and gas phase applications. The material may be selected from either of the modified $LaNi_5$ or modified TiNi families formulated to have a crystallite size of less than 200 Angstroms and most preferably less than 100 Angstroms.

57 Claims, 5 Drawing Sheets

HYDROGEN STORAGE MATERIALS HAVING A HIGH DENSITY OF NON-CONVENTIONAL USEABLE HYDROGEN STORING SITES

FIELD OF THE INVENTION

The present invention relates to disordered hydrogen storage materials characterized by an extraordinarily high density of useable hydrogen storing sites characterized by unusual local order, said material particularly applicable for use in electrochemical rechargeable nickel metal hydride batteries.

More particularly, in a preferred embodiment, the invention relates to nickel metal hydride (Ni-MH) rechargeable batteries having disordered negative electrodes formed of highly modified $LaNi_5$ and highly modified TiNi based electrochemical hydrogen storage alloys. In addition to very high hydrogen storage capacity, batteries that incorporate the alloys of the instant invention have electrochemical performance characteristics, such as cycle life, charge retention, low temperature, and energy density, that are as good as or better than known rechargeable cells nickel metal hydride batteries. The relatively flat PCT curves make variants of these hydrogen storage alloys promising candidates for the gas phase storage and release of hydrogen.

BACKGROUND OF THE INVENTION

In rechargeable alkaline cells, weight and portability are important considerations. It is also advantageous for rechargeable alkaline cells to have long operating lives without the necessity of periodic maintenance. Rechargeable alkaline cells are used in numerous consumer devices such as portable computers, video cameras, and cellular phones. They are often configured into a sealed power pack that is designed as an integral part of a specific device. Rechargeable alkaline cells can also be configured as larger cells that can be used, for example, in industrial, aerospace, and electric vehicle applications.

The materials proposed in the prior art for use as hydrogen storage negative electrode materials for secondary batteries are materials that primarily have simple crystalline structures. In simple crystalline materials, the catalytic and storage active sites result from accidently occurring, surface irregularities which interrupt the periodicity of the crystalline lattice. A few examples of such surface irregularities are dislocation sites, crystal steps, surface impurities and foreign absorbates. For more than three decades, virtually every battery manufacturer in the world pursued such crystalline electrode materials for electrochemical applications, but none produced a commercially viable nickel metal hydride battery until after the publication of U.S. Pat. No. 4,623,597 (the '597 patent) to Ovshinsky, et al, which disclosed Ovshinsky's fundamentally new principles of electrode material design that commercial electrochemical products began to appear.

As taught in the '597 patent (the contents of which are incorporated by reference), a major shortcoming of basing negative electrode materials on simple ordered crystalline structures is that irregularities which result in the aforementioned catalytically active sites occur relatively infrequently. This results in a relatively low density of catalytic and/or storage sites and consequently poor stability. Of equal importance is that the type of catalytically active sites available are of an accidental nature, relatively few in number and are not designed into the material as are those of the present invention. Thus, the efficiency of the material in storing hydrogen and its subsequent release is substantially less than that which would be possible if a greater number and variety of sites were available.

Ovshinsky's fundamental principles overcome the limitations of the prior art by improving the characteristics of the negative electrode through the use of disordered materials to greatly increase the reversible hydrogen storage characteristics required for efficient and economical battery applications. By applying the principles of disorder, it has become possible to obtain a high energy storage, efficiently reversible, high electrical efficient battery in which the negative electrode material resists structural change, poisoning, resistance to the alkaline environment, good self-discharge characteristics and hence low cycle life and deep discharge capabilities. The resulting disordered negative electrode materials are formed from lightweight, low cost elements by techniques that assure formation of primarily non-equilibrium metastable phases resulting in high energy and power densities and low cost. These non-equilibrium, metastable phases assure the formation of localized states where a special degree of disorder, if properly fabricated, can come from the structural and compositional disorder of the material.

The materials described generally in the '597 patent have a greatly increased density of catalytically active sites providing for the fast and stable storage and release of hydrogen. This significantly improved the electrochemical charging/discharging efficiencies and also showed some increases in hydrogen storage capacity. Generally, this was accomplished by the bulk storage of hydrogen atoms at bonding strengths within the range of reversible electromotive force suitable for use in secondary battery applications. More specifically, such negative electrode materials were fabricated by manipulating the local chemical order and hence the local structural order by the incorporation of selected modifier elements into the host matrix to create the desired disorder, type of local order and metal hydrogen bond strengths. The resulting multicomponent disordered material had a structure that was amorphous, microcrystalline, multiphase polycrystalline (but lacking long range compositional order), or a mixture of any combination of these structures.

The host matrix of the materials described in the '597 patent were formed from lightweight elements that are hydride formers. This host matrix was modified by incorporating selected modifier elements that could also be hydride formers. These modifiers enhanced the disorder of the final material, thus creating a much greater number and spectrum of catalytically active sites and some increase in the number of hydrogen storage sites. Multiorbital modifiers (such as transition elements) provided the greatly increased number of sites due to various bonding configurations available. For reasons explained in greater detail hereinbelow, the resulting increase in useable capacity was primarily due to the formation of the aforementioned increase in catalytic sites which more efficiently store and release hydrogen. Because of this more efficient storage and release of hydrogen and because of the higher density of the catalytic sites, the hydrogen more readily found a storage site. Unfortunately, there remained, until the instant invention, an insufficient density of new hydrogen storage sites formed due to disorder to significantly increase the hydrogen storage capacity of the material.

The '597 patent describes the use of, inter alia, rapid quench to form disordered materials having unusual electronic configurations, which results from varying the three-dimensional interactiors of constituent atoms and their various orbitals. Thus, it was taught that the compositional, positional and translational relationships of the constituent atoms were not limited by crystalline symmetry in their freedom to interact. Selected elements could be utilized to further control the disorder of the material by their interaction with orbitals so as to create the desired local internal chemical environments. These various and at least partially unusual configurations generate a large number of catalytically active sites and hydrogen storage sites not only on the surface but throughout the bulk of the material. The internal topology generated by these various configurations allowed for selective diffusion of hydrogen atoms.

In general, disorder in the modified material can be of an atomic nature in the form of compositional or configurational disorder provided throughout the bulk of the material or in numerous regions or phases of the material. Disorder can also be introduced into the host matrix by creating microscopic phases within the material which mimic the compositional or configurational disorder at the atomic level by virtue of the relationship of one phase to another. For example, disordered materials can be created by introducing microscopic regions or phases of a different kind or kinds of crystalline phases, or by introducing regions of an amorphous phase or phases, or by introducing regions of an amorphous phase or phases in addition to regions of a crystalline phase or phases. The types of disordered structures that provide local structural chemical environments for improved hydrogen storage characteristics include amorphous materials, microcrystalline materials, multicomponent multiphase polycrystalline materials lacking long range composition order or multiphase materials containing both amorphous and crystalline phases.

Short-range, or local, order is elaborated on in U.S. Pat. No. 4,520,039 to Ovshinsky, entitled Compositionally Varied Materials and Method for Synthesizing the Materials, the contents of which are incorporated by reference. This patent discloses that disordered materials do not require periodic local order and how spatial and orientational placement of similar or dissimilar atoms or groups of atoms is possible with such increased precision and control of the local configurations that it is possible to produce qualitatively new phenomena. In addition, this patent discusses that the atoms used need not be restricted to "d band" or "f band" atoms, but can be any atom in which the controlled aspects of the interaction with the local environment and/or orbital overlap plays a significant role physically, electronically, or chemically so as to affect physical properties and hence the functions of the materials. The elements of these materials offer a variety of bonding possibilities due to the multidirectionality of f-orbitals, d-orbitals or lone pair electrons. The multidirectionality ("porcupine effect") of d-orbitals provides for a tremendous increase in density of sites, the spectrum of types of sites and hence the presence of active storage sites. Following the teaching can result in a means of synthesizing new materials which are disordered in several different senses simultaneously.

The '597 patent is described in detail above because this patent represents a starting point for the investigation that resulted in the present invention. Ovshinsky's '597 patent introduced the concept of making negative electrode material for nickel metal hydride batteries from multicomponent disordered alloys. This teaching was diametrically opposed to the conventional "wisdom" of battery manufacturers at the time. It was not until this concept was adopted in production processes by said manufacturers that negative electrode materials with an increased number of catalytically active sites were produced and nickel metal hydride batteries became commercially viable. In capsule form, the '597 patent taught that significant additional sites for hydrogen catalysis (to allow the rapid storage and release of hydrogen and greatly improve stability) were formed and made available by purposely fabricating disordered negative electrode material (as opposed to the homogeneous, ordered polycrystalline material of the prior art). The '597 patent also proposed that the use of disorder could be employed to obtain additional hydrogen storage sites. However, it was not appreciated that in order to obtain a substantial increase in hydrogen storage capacity from such non-conventional storage sites, it would be necessary to increase the number of storage sites by approximately 3 orders of magnitude.

Not only was the teaching of the Ovshinsky patent adopted by all nickel metal hydride manufacturers, but in recent years some of these manufacturers have begun to use rapid solidification techniques (as taught by Ovshinsky) to increase the degree of disorder within a negative electrode alloy formula. For instance, Japanese companies have even gone so far as to rapidly quench highly-modified $LaNi_5$-type electrochemical negative electrode material. By employing nonequilibrium processing techniques, the resulting negative electrode material includes hydrogen storage phases and catalytic phases on the order of 2000 Angstroms in average dimension. The hydrogen storage capacity of the negative electrode material does not improve significantly, but the catalytic activity is greatly improved as evidenced by improved rate capability and stability to oxidation and corrosion resistance is improved resulting in increased cycle life.

As mentioned above, certain battery companies have recently begun to investigate the use of rapidly-quenched, highly modified $LaNi_5$ type hydrogen storage materials for electrochemical applications. For example, in Phys. Chem 96 (1992) No. 5 pp. 656–667, P. H. L. Notten, et al of Philips Research Laboratories presented a paper entitled "Me t-Spinning of $AB_{55}$-Type Hydride Forming Compounds and the Influence of Annealing on Electrochemical and Crystallographic Properties." In this paper, non-stoichiometric modified $LaNi_{55}$ materials, $La_6Nd_2Ni_3Co_{24}Si_1$ and $La_6Nd_2Ni_{26}Co_{24}Mo_1$ were rapidly spun These non-stoichiometric materials were compared to their stoichiometric counterparts with the result being that the non-stoichiometric materials demonstrated good, but not unusual hydrogen storage capacity. However, the non-stoichiometric compounds did show the presence of additional volume percents of a catalytic phase, which phase, as predicted by the '597 patent, was responsible for the improved electrochemical properties as compared to the properties found in the examples of stoichiometric material. Once again, and importantly, no significantly higher density of non-conventional hydrogen storage sites were obtained.

In research and development activities at Energy Conversion Devices, Inc. with highly modified TiNi-type electrochemical negative electrode materials, such as described in U.S. Pat. No. 4,637,967 entitled Electrodes Made With Disordered Active Material And Methods Of Making Same, (the disclosure of which is incorporated herein by references rapidly quenched electrode materials were melt spun. The work resulted in having oxidation and corrosion resistance was dramatically improved and cycle life was improved by a factor of five. On the other hand and as was true in the case of the aforementioned Japanese work, no significant increase in hydrogen storage capacity was demonstrated and the phases of the negative electrode material present were also relatively large.

Therefore, while the teachings of the '597 patent were revolutionary for those of ordinary skill in the art in learning to apply Ovshinsky's principals of disorder to negative electrode materials to obtain commercial batteries with commercially viable discharge rates and cycle life stabilities while maintaining good hydrogen storage capacity, the '597 patent provided for the most part generalities to routineers concerning specific processes, processing techniques, alloy compositions, stoichiometries in those compositions, etc. regarding how to further significantly increase the hydrogen storage capacity (as opposed to the catalytic activity). It was not until the subject invention that a teaching was presented of the nature and quantification of additional active storage sites required to significantly increase the hydrogen storage capacity of the negative electrode material through the deliberate introduction of defect sites and the presence of other concurrent non-conventional and/or conventional storage sites.

Despite the exceptional electrochemical performance now provided by current highly disordered nickel metal hydride systems (twice the hydrogen storage capacity of conventional NiCd systems) consumers are demanding increasingly greater run times, safety and power requirements from such rechargeable battery systems. No current battery system can meet these demands. Accordingly, there exists a need for a safe ultra high capacity, high charge retention, high power delivery, long cycle life, reasonably priced rechargeable battery system.

SUMMARY OF THE INVENTION

There is disclosed herein a hydrogen storage material that is characterized by a density of hydrogen storage sites of greater than $1.2 \times 10^{23}$/cc and more preferably greater than $1.5 \times 10^{23}$/cc, corresponding to a specific capacity which is far in excess of conventional hydrogen storage materials. The material can be used as an electrochemical electrode, a gas phase storage alloy or a fuel cell.

There is also disclosed an improved hydrogen storage material formed from an alloy that is selected from the group consisting of alloys represented by the formula $ZrMn_wV_xM_yNi_z$, where M is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z \leq 1.5$, and $2.0 \leq w+x+y+z<2.4$, alloys corresponding substantially to the formula $LaNi_5$ in which one of the components La or Ni is substituted by a metal M selected from Groups Ia, II, II, IV, and Va of the Periodic Table of the Elements other than lanthanides, in an atomic proportion which is higher than 0.1% and lower than 25%; alloys having the formula $TiV_{2-x}Ni_x$, where x=0.2 to 0.6; alloys having the formula $Ti_aZr_bNi_cCr_dM_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.2$; alloys having the formula $ZrMo_dNi_e$ where d=0.1 to 1.2 and e=1.1 to 2.5; alloys having the formula $Ti_{1-x}Zr_xMn_{2-y-z}Cr_yV_z$ where $0.05 \leq x \leq 0.4$, $0 < y \leq 1.0$, and $0 < z \leq 0.4$; alloys having the formula $LnM_5$ where Ln is at least one lanthanide metal and M is at least one metal chosen from the group consisting of Ni and Co; alloys comprising at least one transition metal forming 40–75% by weight of said alloys chosen from Groups II, IV, and V of the Periodic System, and at least one additional metal, making up the balance of said electrochemical hydrogen storage alloy, alloyed with the at least one transitional metal, this additional metal chosen from the group consisting of Ni, Cu, Ag, Fe, and Cr—Ni steel, and alloys comprising a main texture of an Mm—Ni system; and a plurality of compound phases where each compound phase is segregated in the main texture, and wherein the volume of each of the compound phases is less than about 10 $\mu m^3$. The improvement in the aforementioned hydrogen storage materials comprises providing a crystallite size of less than about 200 Angstroms and more particularly less than about 100 Angstroms, where the small crystallite size, in a preferred embodiment is achieved via rapid solidification with a significant increase in the density of active hydrogen storage sites present in the resultant ground powder which is believed to be due, at least in part, to a high defect density in the melt spun ribbon. Therefore, the improved hydrogen storage materials of the present invention have achieved higher hydrogen storage via a microcrystalline, nanocrystalline, and/or an amorphous microstructure as opposed to the conventional polycrystalline embodiments of these allows currently employed by all other nickel metal hydride battery manufacturers.

There is further disclosed herein a hydrogen storage material having a high density of useable hydrogen storage sites. This high density is created through the use of non-conventional hydrogen storage sites in combination with conventional hydrogen storage sites. That is, the non-conventional hydrogen storage sites substantially contribute to the total hydrogen storage capacity of the alloy (when compared to the cast alloys). Preferably the non-conventional hydrogen storage sites contribute to at least 5 or 10% of the total hydrogen storage capacity of the material. More preferably, the non-conventional hydrogen storage sites contribute to at least 20 or 33% of the total hydrogen storage capacity of the material. Most preferably, the non-conventional hydrogen storage sites contribute to at least 50% of the total hydrogen storage capacity of the material.

The non-conventional hydrogen storage sites are preferably created by rapidly solidifying a molten material, such as a molten hydride forming alloy material, and thereafter grinding the solidified material to a powder. The non-conventional sites may also be created by other rapid quench techniques such as plasma spraying in which metastable phases and small particle size with a high ratio of surface states to bulk states is present. The hydride forming alloy may be either stoichiometric or non-stoichiometric and may be either a TiNi type alloy or a $LaNi_5$ type alloy. The alloys typically will contain both hydride-forming elements and modifier elements.

For a typical TiNi type alloy, the hydride-forming elements may be selected from the group consisting of Ti, V, Zr and mixtures or alloys thereof and the modifier elements may be selected from the group consisting of Ni, Cr, Co, Mn, Mo, Nb, Fe, Al, Mg, Cu, Sn, Ag, Zn, or Pd and mixtures or alloys thereof. Alternatively, for a typical $LaNi_5$ type alloy, the hydride-forming elements may be selected from the group consisting of Sc, Y, La, Ce, Pr, Nd, Sm, Mm and mixtures or alloys thereof and the modifier elements may be selected from the group consisting of Ni, Cr, Co, Mn, Fe, Cu, Sn, Al, Si, B, Mo, V, Nb, Ta, Zn, Zr, Ti, Hf, W and mixtures or alloys thereof.

The hydride forming alloy may further include at least one glass forming element selected from the group consisting of Al, B, C, Si, P, S, Bi, In, Sb and mixtures or alloys thereof.

The hydrogen storage material is preferably a compositionally and/or structurally disordered, multi-component material having a crystalline size on the order of less than about 200 Å. More preferably the crystallites are on the order of less than about 150 Å. Most preferably the crystallites are on the order of less than about 100 or 75 Å. The hydrogen storage material preferably is multi-phase and contains both catalytic phases and hydrogen storage phases which are most preferably in close proximity to each other. Some or all of these phases are preferably characterized by a substantially higher density of active hydrogen storage sites which may be, a least in part, attributed to a high defect density in addition to conventional hydrogen storage sites and catalytically active sites, such that the total amount of active hydrogen storage sites is significantly higher than that expected from conventional hydrogen storage sites and exemplified eletrode material having much higher specific capacity and small crystallite sites as compared to conventional polycrystalline electrode materials.

The hydrogen storage material of the present invention preferably includes minimal phases of hydride forming elements that do not form active hydride storage sites and substantially no phases of hydrides with incorrect bond strengths for use in electrochemical applications.

There is additionally disclosed a rapidly solidified hydrogen storage alloy ribbon, said ribbon characterized by a defect density of at least $5\times10^{21}$/cc, preferably at least $1\times10^{22}$/cc and most preferably at least $5\times10^{22}$/cc. Such defect density provides for the ribbon to fracture, when ground, into the very small nanocrystalline crystallite sizes referenced herein so as to allow for the extraordinarily high surface to bulk ratio of hydrogen bonding sites.

There is further disclosed a rapidly solidified hydrogen storage alloy having the composition: (Ovonic Base Alloy)$_a M_b$ where Ovonic Base Alloy represents an Ovonic alloy that contains 0.1 to 60 atomic percent Ti, 0.1 to 50 atomic percent Zr, 0.1 to 60 atomic percent V, 0.1 to 60 atomic percent Ni, and 0.1 to 56 atomic percent Cr, as described above;

a is at least 70 atomic percent;

M represents at least one modifier chosen from the group consisting of Co, Mn, Al, Fe, W, La, Mo, Cu, Mg, Ca, Nb, Si, and Hf;

b is 0 to 30 atomic percent;

b>0; and a+b=100 atomic percent.

The alloy is characterized by a 5% greater hydrogen storage capacity than the same material in cast form. Preferably the increase is 10, 20, 33 or even 50% greater than cast. The preferred composition is, in atomic percent, 0.5–2.0% V; 7.0–8.5% Cr; 6.0–8.0% Ti; 20–35% Zr; 0.01–0.5% Fe; 15–25% Mn; 1.5–3.0% Co; 25–40% Ni; and 0.01–2.0% Mg.

DETAILED DESCRIPTION OF THE INVENTION

Figure 1:
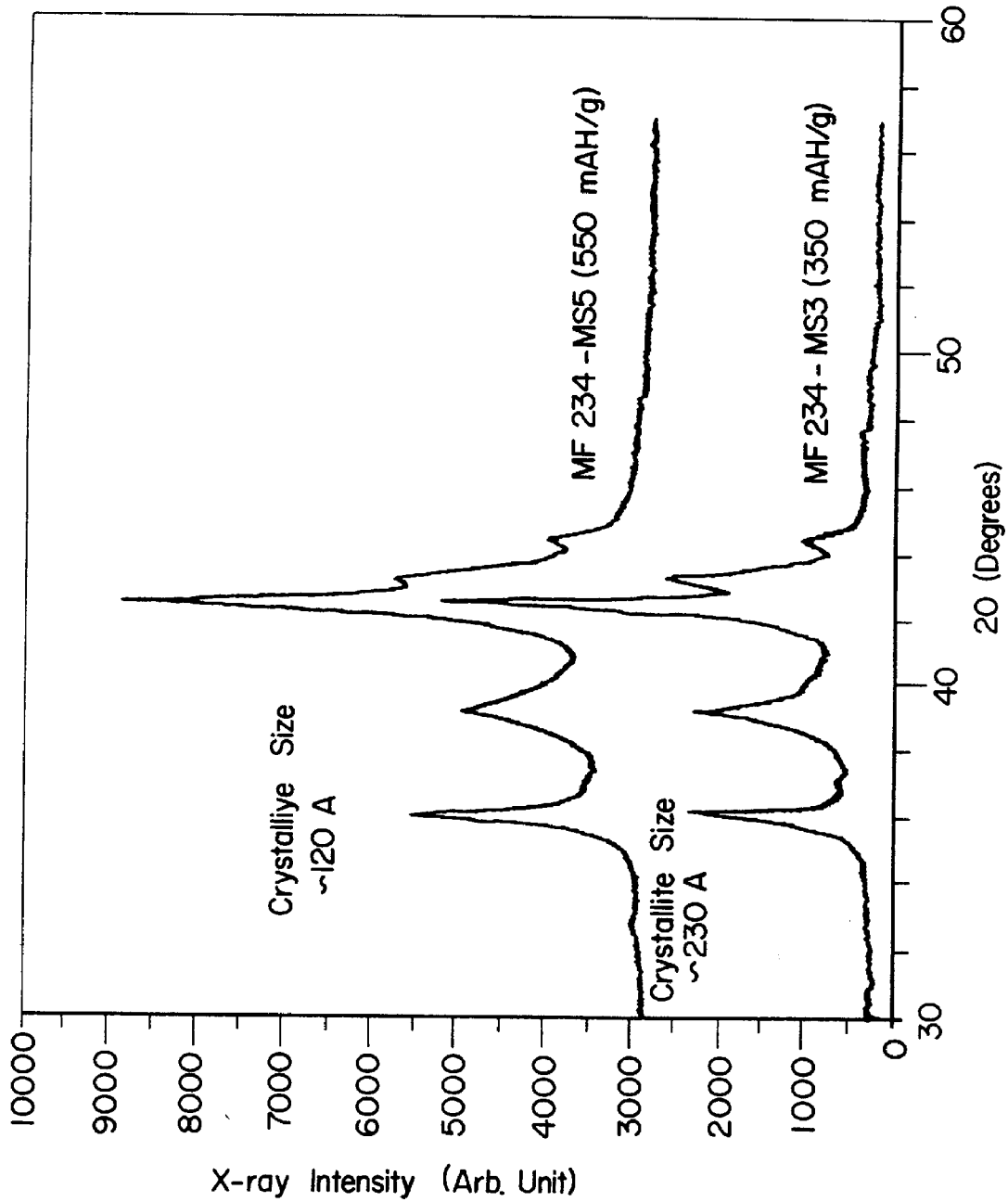
FIG. 1 plots x-ray diffraction patterns for melt spun hydrogen storage materials, the upper plot teing for a material within the scope of the instant invention and the lower plot being for a material outside the scope of the instant invention.

The instant inventors have developed a hydrogen storage material which is characterized by a uniquely high hydrogen storage capacity created by non-conventional storage sites as well as conventional storage sites and whereby the non-conventional hydrogen storage sites substantially contribute to the total hydrogen storage capacity. While all storage materials have both conventional hydride storage sites and non-conventional storage sites, typically the non-conventional storage sites are accidental artifacts within the crystalline lattice constraints of the material and are insignificant in number and/or density to affect the overall storage capacity of the electrode material. Therefore, hydrogen storage capacity due to the non-conventional storage sites is not significant when compared with storage due to conventional sites. However, in the materials of the instant invention, the non-conventional storage sites substantially contribute to the total hydrogen storage capacity thereby achieving remarkably high and unexpected hydrogen storage capacity.

To elaborate, the total number of conventional hydride sites for a typical electrochemical hydrogen storage material (such as a highly ordered polycrystalline material) is generally limited to about one hydrogen atom per hydridable metal atom and may be on the order of about $1\times10^{23}$ sites/cc. The conventional hydride storage sites are locations in the material's structural lattice at which a hydrogen atom bonds into the electronic lattice in a low energy state. There are, for any particular material, a number of these conventional sites that are proportional to the formula and microstructure of the alloy and are dependent upon the amount of hydride forming elements in the formula as well as the bond strengths of constituent phases. For example, whereas $LaNi_5$ type alloys are usually denoted as $LaNi_5H_6$, i.e., one hydrogen atom per one metal atom, VTiZrNi type alloys may have up to 1–1.4 hydrogen atoms per each metal atom. The constraint comes not only from the crystalline structure, but also from the shrinkage of adjacent prospective sites when a hydrogen atom occupies a particular site. Consequently, the typical hydrogen/metal ratio of the best of conventional materials is only about 1 to 1.4.

In the materials of the instant invention the available or useable hydrogen storage sites has been increased to much greater than $1\times10^{23}$ to even as high as $1.5–1.8\times10^{23}$. Also, the ratio of hydrogen to metal is much greater than expected as per the explanation set forth in the preceding paragraph.

Though not wishing to be bound by theory, it should be noted that in the prior art hydrogen storage materials, whether electrochemical or thermal, the total number of defect sites may be on the order of $10^{14}$ sites/cc. These defect sites are typically due to lattice defects such as steps, dislocations, surface impurities, crystalline plane dislocations, foreign adsorbate dislocations, surface states, etc. Although not initially apparent, the reader should note that each of these defect sites may create as many as 1000 active hydrogen storage sites as the affect of the defect reverberates throughout the lattice. Thus, $10^{15}$ defect sites/cc are theoretically capable of creating as many as $10^{19}$ active hydrogen storage sites. However, since the number of conventional hydrogen storage sites is on the order of $10^{23}$ sites/cc, the number of active sites due to convention defects is inconsequential in comparison. In order to obtain a meaningful contribution from defects that can serve as additional active hydrogen storage sites, it is necessary to deliberately increase the density of non-conventional sites to about $10^{19}$ sites/cc. In this manner, the 1000 fold increase in active hydrogen storage sites could reach the $10^{22}$–$10^{23}$ level and contribute significantly to higher useable storage capacity. It should be readily apparent that the typical number of accidental lattice defect sites is extremely small when compared with the number of conventional hydrogen storage sites by several orders of magnitude.

In contradistinction to the orior art hydrogen storage materials, the number of defect sites of the hydrogen storage materials of the instant invention is much higher. Specifically, the instant inventors have produced materials having a higher density of defect sites than the number of active storage sites present in most previously produced materials (reaching defect densities up to $5 \times 10^{21}$/cc, $1 \times 10^{22}$/cc and even $5 \times 10^{22}$/cc). There are two possible mechanisms through which this extremely high density of defect states can contribute to the hydrogen storage sites of the material. The first, as implied above, is that hydrogen is stored directly in the defects themselves. This storage mechanism is straight forward and easy to understand. The hydrogen merely finds these low energy defect sites in the lattice structure and uses them as it would for conventional low energy lattice sites.

However, it should be noted that the high level of defects sites is noted in the melt spun ribbon. It is unclear if these defects sties remain in the ground powder (at least in large enough numbers to account for the instant materials which receive 5, 10, 20, 33, even 50% of their total hydrogen storage capacity (compared with cast) by storage of hydrogen at non-conventional storage sites.) It is possible that once the ribbons are ground into powder, many of the lattice defects will be translated into crystallite surface states. That is, as the ribbons are ground, the material is fractured along the defects and these will no longer be internal crystallite defects, but will now be a massive amount of new crystallite surfaces, i.e., the ratio of surface sites to bulk sites become similar.

Therefore, another means to explain the extremely high number of non-conventional hydrogen storage sites is by the greatly increased number of and reduced size of the crystallites. The small size of the crystallites increases the number of surface states of the material. These surface states in turn can account for the non-conventional storage sites. That is, these surface sites, because they are not bound by additional crystalline lattice have more room to expand, and thus are not confined by nearby bound hydrogen. Therefore, these surface sites that conventionally would have been precluded from storing hydrogen (because they would have been inside a crystallite) are now capable of storing hydrogen. Most importantly, such surface sites the degree of local disorder presented by a surface state is much different than that presented by a bulk state. The degree of freedom, the possible unusable bonding configurations and the type of orbital overlaps change the nature of surface defects in a dramatic fashion. It is possible that the bonding options offered by the small crystallite surface states of the instant invention are the most energetic possible and that is the reason for the remarkably high hydrogen storage capacity demonstrated herein.

As alluded to above, the materials of the present invention are preferably prepared by rapidly solidifying a molten material using melt spinning and thereafter grinding the solidified material to a powder. A preferred melt spinning apparatus employs a boron nitride crucible and a copper beryllium chill wheel contained in an evacuated chamber continuously filled with argon at a rate of 1–10, preferably 2–8, or most preferably 3–5 liters per minute. Once the desired quantities of alloy components have been added to the boron nitride crucible, the crucible is heated to a temperature of 1000°–2100° C., preferably 1200°–1900° C., or most preferably 1450°–1800° C.

The size of the orifice of the crucible, the wheel speed, the chill rate, and the pressure under which the melt is forced from the crucible are all interrelated, and control the formation of the microstructure in the materials of the present invention. Generally, these factors must be chosen so that the melt is sufficiently cooled while on the wheel to produce the desired high defect microstructure. It is envisioned that rapid solidification processes other than melt spinning may allow the formation of the high defect microstructure necessary to create the hydrogen storage material of the instant invention having the requisite particle size and density of catalytic and hydrogen storage sites. For example, gas atomization, planar flow casting, plasma spray, and other accelerated quenching processes may be substituted for melt spinning and hence are well within the spirit and scope of this invention.

The temperature of the chill wheel can be any temperature from −273° to 90° C., preferably 0° to 75° C., and most preferably 10° to 25° C. The wheel itself preferably has a copper beryllium surface, although any high hardness, high melting point material unreactive to the molten stream may be used.

The preferred hydrogen storage materials of the instant invention are hydride forming alloys. The hydride forming alloy may be either stoichiometric or non-stoichiometnc and may be either TiNi type alloys, LaNi$_5$ type alloys or mixtures thereof. While the alloys can be of any known prior art composition, typically they will contain both hydride-forming elements and modifier elements.

For a typical TiNi type alloy, the hydride-forming elements may be selected from the group consisting of Ti, V, Zr and mixtures or alloys thereof and the modifier elements may be selected from the group consisting of Ni, Cr, Co, Mn, Mo, Nb, Fe, Cu, Sn, Ag, Zn, or Pd and mixtures or alloys thereof. Alternatively, for a typical LaNi$_5$ type alloy, the hydride-forming elements may be selected from the group consisting of Sc, Y, La, Ce, Pr, Nd, Sm, Mm and mixtures or alloys thereof and the modifier elements may be selected from the group consisting of Ni, Cr, Co, Mn, Fe, Cu, Sn, Mo, V, Nb, Ta, Zn, Zr, Ti, Hf, W and mixtures or alloys thereof.

The hydride forming alloy may further include at least one glass forming element selected from the group consibting of Al, B, C, Si, P, S, Bi, In, Sb and mixtures or alloys thereof. Specifically useful alloy compositions may include alloys selected from the group consisting of:

alloys represented by the formula ZrMn$_w$V$_x$M$_y$Ni$_z$, where M is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z \leq 1.5$, and $2.0 \leq w+x+y+z \leq 2.4$;

alloys corresponding substantially to the formula LaNi$_5$ in which one of the components La or Ni is substituted by a metal M selected from Groups Ia, II, III, IV, and Va of the Periodic Table of the Elements other than lanthanides, in an atomic proportion which is higher than 0.1% and lower than 25%;

alloys having the formula TiV$_{2-x}$Ni$_x$, where x=0.2 to 0.6;

alloys having the formula Ti$_a$Zr$_b$Ni$_c$Cr$_d$M$_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.2$;

alloys having the formula $ZrMo_dNi_e$ where d=0.1 to 1.2 and e=1.1 to 2.5;

alloys having the formula $Ti_{1-x}Zr_zMn_{2-y-z}Cr_yV_z$ where $0.05 \leq x \leq 0.4$, $0 < y \leq 1.0$, and $0 < z \leq 0.4$;

alloys having the formula $LnM_5$ where Ln is at least one lanthanide metal and M is at least one metal chosen from the group consisting of Ni and Co;

alloys comprising at least one transition metal forming 40–75% by weight of said alloys chosen from Groups II, IV, and V of the Periodic System, and at least one additional metal, making up the balance of said electrochemical hydrogen storage alloy, alloyed with the at least one transitional metal, this additional metal chosen from the group consisting of Ni, Cu, Ag, Fe, and Cr—Ni steel;

alloys comprising a main texture of an Mm—Ni system; and a plurality of compound phases where each compound phase is segregated in the main texture, and wherein the volume of each of the compound phases is less than about 10 $\mu m^3$; and alloys having a the composition: (Ovonic Base Alloy) $_aM_b$; where Ovonic Base Alloy represents an Ovonic alloy that contains 0.1 to 60 atomic percent Ti, 0.1 to 50 atomic percent Zr, 0.1 to 60 atomic percent V, 0.1 to 60 atomic percent Ni, and 0.1 to 56 atomic percent Cr, as described above;

a is at least 70 atomic percent;

M represents at least one modifier chosen from the group consisting of Co, Mn, Al, Fe, W, La, Mo, Cu, Mg, Ca, Nb, Si, and Hf;

b is 0 to 30 atomic percent;

b>0, and a+b=100 atomic percent.

Alloys of the invention were prepared having the specific formulae set forth below in Table 1, which are covered by the generic composition in atomic percent: 0.5–2.0% V; 7.0–8.5% Cr; 6.0–8.0% Ti; 20–35% Zr; 0.01–0.5% Fe; 15–25% Mn; 1.5–3.0% Co; 25–40% Ni; and 0.01–2.0% Mg.

TABLE 1

| Alloy Number | Alloy Compositions in Atomic Percent |||||||||
|---|---|---|---|---|---|---|---|---|---|
| | V | Ti | Zr | Ni | Co | Cr | Fe | Mg | Mn |
| 1 | 1.4 | 7.5 | 28.9 | 31.8 | 2.5 | 7.7 | 0.13 | 0.7 | 19.3 |
| 2 | 1.3 | 7.8 | 29.2 | 31.6 | 2.4 | 7.8 | 0.12 | 0.3 | 19.3 |
| Conventional Cast | 1.4 | 7.5 | 28.9 | 32.7 | 2.5 | 7.7 | — | — | 19.3 |

EXAMPLE

Bulk negative electrode materials according to the present invention were rapidly solidified by melt spinning. Raw materials in powder form following the compositions set forth above in Table 1 were put into a boron nitride crucible heated to a temperature of about 1050° C. This crucible had a 0.97 mm orifice through which the melt was injected onto a fast spinning copper beryllium wheel (turning at around 26 m/s). The wheel was cooled by continuously running water at 17° C. The crucible and wheel where enclosed in a chamber that was pumped down and then filled with argon supplied at the rate of 3–5 L/min.

The resulting ribbons and flakes collected at the bottom of the chamber. These were ground for 30–90 minutes. The final powder has a particle size of about 200 mesh. These materials were then pressed onto a nickel wire screen and compacted to form disordered negative electrodes. These disordered negative electrodes were assembled into cells. These cells were cycled and the results are presented in Table 2, below and compared to the same alloy (as above) prepared by conventional casting.

TABLE 2

| Alloy Number | initial capacity (mAh/g) | cycling capacity (mAh/g) |
|---|---|---|
| 1 | 317 | 322 |
| 2 | 535 | 556 |
| Conventional Cast | 340 | 340 |

As can be seen from a perusal of Table 2, not all melt spun alloys exhibit the greatly increased capacity. When analyzed, the alloy materials having greatly enhanced storage capacity where shown to have many differences from those having "normal" capacity. Samples 1 and 2 have been chosen for comparison due to their essentially identical composition.

One such difference can be seen in the crystallite size of the materials. The microstructure of these materials was analyzed using x-ray diffraction (XRD). Comparison of the crystallite sizes of the samples 1 and 2 (as derived from the XRD plots of FIG. 1) shows that the material of sample 1 has an average crystallite size of about 230 Å, while the material of sample 2 has an average crystallite size of about 120 Å. Additional data from SEM indicates that the crystallite size of the powder may be even smaller than 120 Å and may be as low as 50 Å or even less. As discussed above, this difference in crystallite size may have a substantial effect on storage capacity. It may be that these small crystallites contribute non-conventional storage sites (i.e. surface state sites, crystallite boundary sites, etc.). Therefore, the hydrogen storage material of the instant invention is preferably a compositionally or structurally disordered, multi-component material having a crystalline size on the order of less than about 200 Å. More preferably the crystallites are on the order of less than about 150 or 125 Å. Most preferably the crystallites are on the order of less than about 100 or 50 Å. This nanocrystalline microstructure exhibits useful intermediate range order.

Figure 2A:
FIGS. 2(A) and (B) are a side by side comparison of SEM photographs of melt spun hydrogen storage materials, the left photograph being for a material outside the scope of the invention and the right photograph being for a material within the scope of the invention.
Figure 2B:
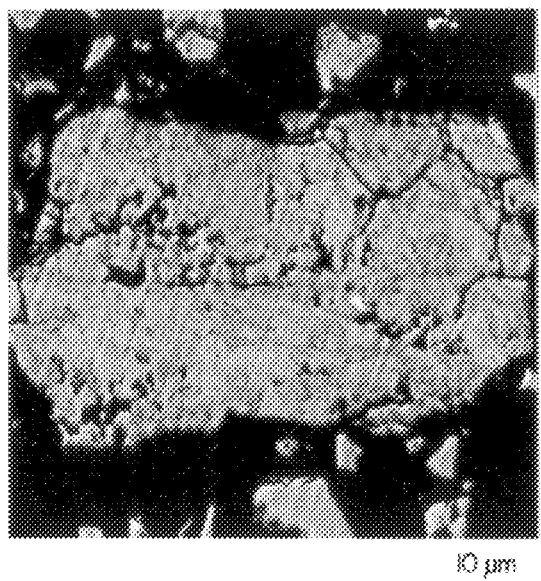

Another difference may be see by comparison of scanning electron microscope (SEM) pictures of particles of samples 1 and 2 seen in FIG. 2. In FIG. 2 the SEM picture on the left is that of the sample 3 material, while the SEM picture on the right is that of sample 2. Comparison dearly indicates that the material of sample 1 is phase segregated (i.e. the catalytic and storage phases are separated in relatively large dumps), while the material of sample 2 is highly uniform with both catalytic and storage phases intimately mixed throughout. This high uniformity allows for better utilization of the storage material. Therefore, the hydrogen storage material of the instant invention is preferably multi-phase and contains both catalytic phases and hydrogen storage phases which are intimately mixed in close proximity to each other. It is also possible that the more uniform microstructure indicates more uniform cooling and possibly a higher defect density than sample 1.

Figure 3:
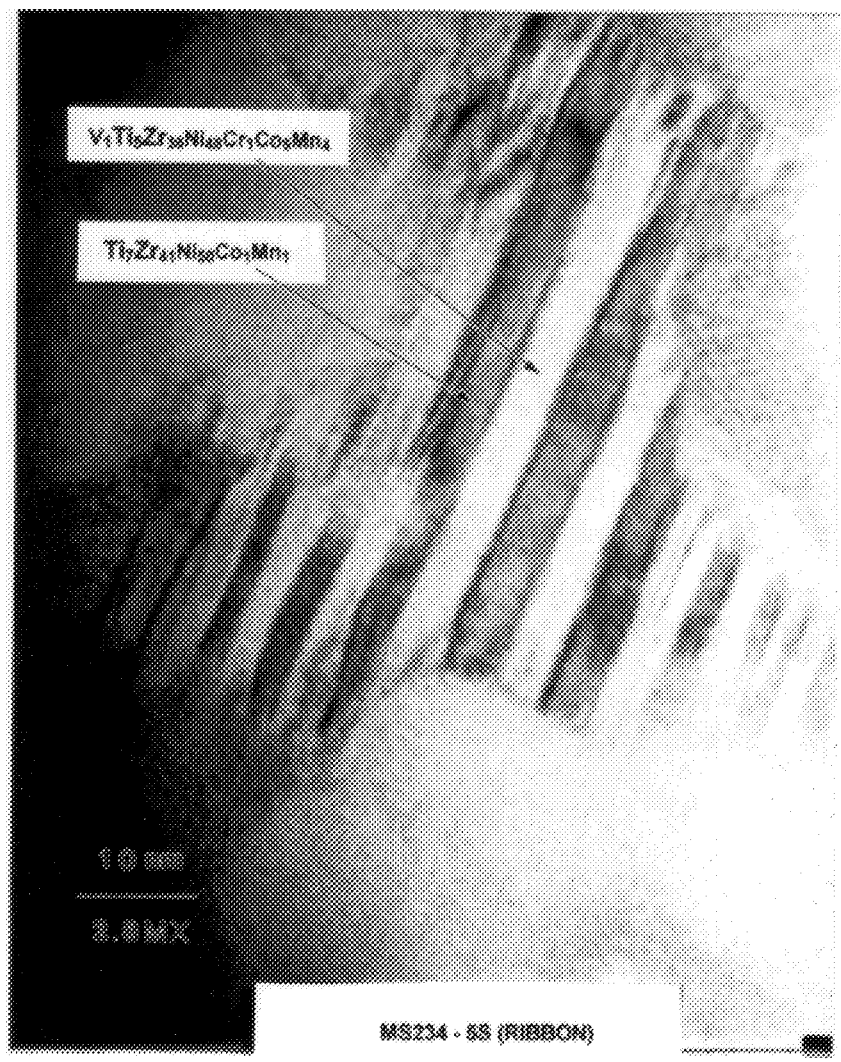
FIG. 3 is a highly magnified TEM-bright field photograph of a melt spun ribbon flake of a hydrogen storage material of the instant invention, specifically shown is the intimately striated catalytic and storage phases of the material.
Figure 4:
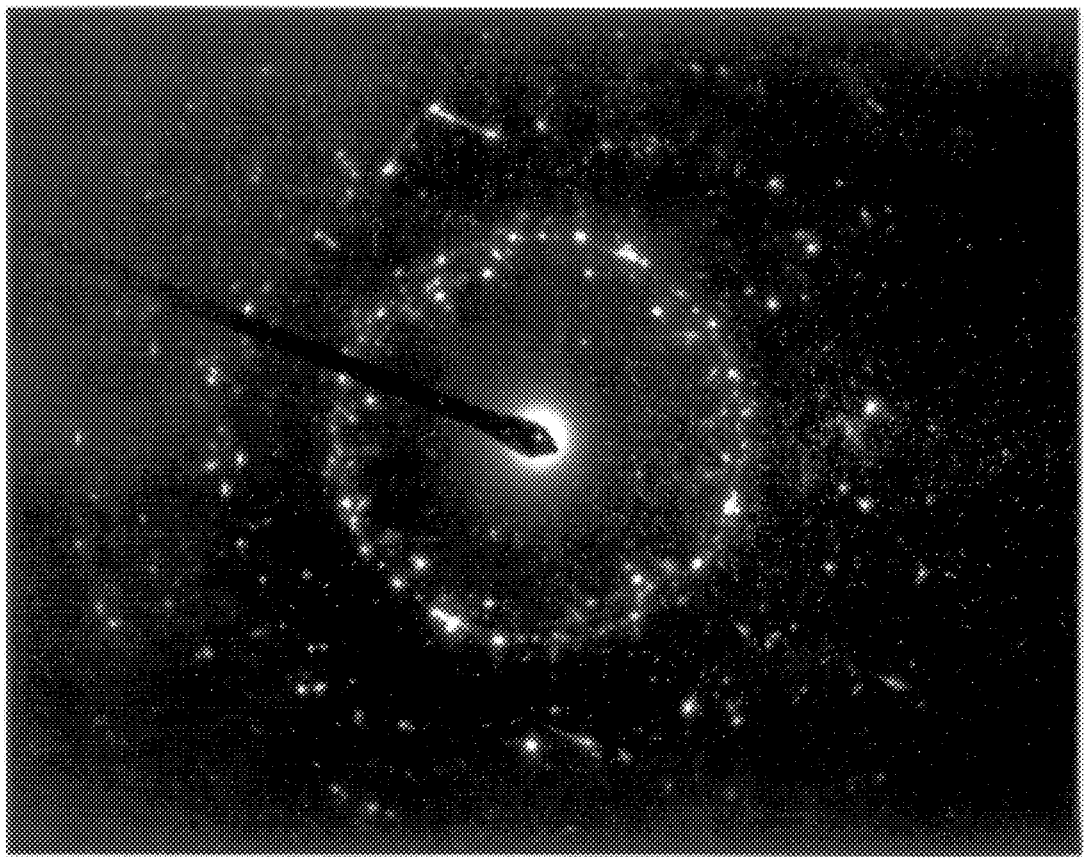
FIG. 4 is an electron diffraction pattern of the material of FIG. 3, this figure indicates the extremely high density of defects in the material.

FIG. 3 is an TEM-bright field photograph of the melt spun ribbon (before grinding) of sample 2. The different phases (i.e. catalytic and storage) can clearly be seen as light and dark bands striated throughout the material. Also, the figure shows the very high defect state of the ribbon material. FIG. 4 is an electron diffraction pattern of the material of FIG. 3

(i.e. sample 2). The relative randomness and multitude of dots on the pattern are an additional indication of the extremely large defect density of the material. In fact, the technical experts who assisted in performing analysis of the material indicated that it has the highest defect density of any material that has ever been seen! This extremely high defect density appears to be, in one way or another, the main contributor to the greatly increased capacity of the material.

Figure 5:
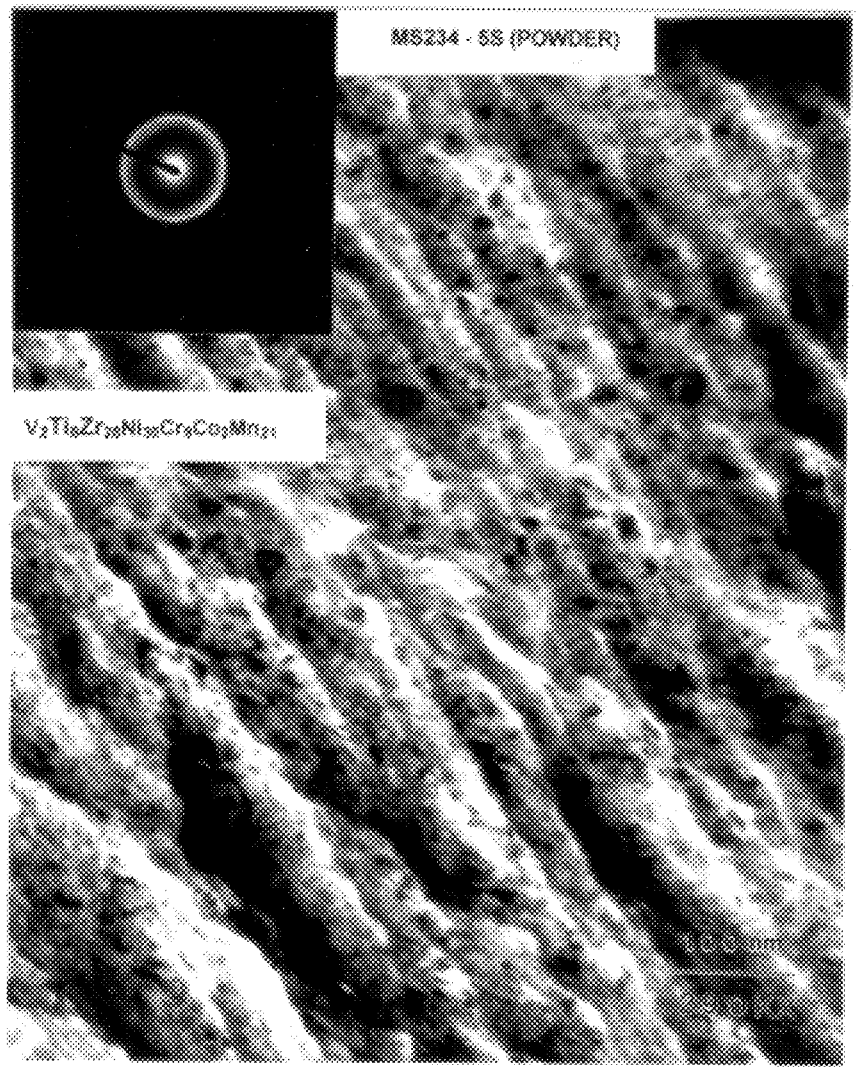
FIG. 5 is an TEM-dark field photograph of a powdered hydrogen storage material of the instant invention, specifically illustrating the high uniformity of the material.

FIG. 5 is an TEM-dark field photograph of the alloy material of sample 2 after it has been ground into powder. As can be seen, the material is still highly uniform. It should also be noted that since the material has such as high density of defects, it is easily ground into a powder and need not be pre-hydrided to increase its friability.

Finally, two other notable properties of the hydrogen storage material of the instant invention are that the material preferably includes substantially no phases which include hydride forming elements but do not form hydride storage sites and substantially no phases which include hydrides with incorrect bond strengths.

Therefore, it can clearly be seen that the hydrogen storage materials of the present invention show tremendous promise for commercial, industrial and consumer uses. These materials may be used for gas phase hydrogen storage, as well as, electrochemical applications and are particularly well suited for use in nickel hydride batteries.

While the present invention has been described in conjunction with specific embodiments, those of normal skill in the art will appreciate that modifications and variations can be made without departing from the scope of the present invention. Such modifications and variations are envisioned to be within the scope of the appended claims. Particularly included within the scope of said claims are hydrogen storage materials for non-electrochemical applications, such as thermal hydrogen storage or heat pump applications.

We claim:

1. A high capacity hydrogen storage material characterized by a density of hydrogen storage sites of greater than $1.2 \times 10^{23}$/cc.

2. The hydrogen storage material of claim 1, wherein the density of hydrogen storage sites is greater than $1.5 \times 10^{23}$/cc.

3. The hydrogen storage material of claim 2, wherein said material is an electrochemical electrode.

4. The hydrogen storage material of claim 2, wherein said material is a gas phase storage material.

5. The hydrogen storage material of claim 1, wherein said density of storage sites are obtained from conventional storage sites and defect storage sites.

6. The hydrogen storage material of claim 1, wherein said density of storage sites are obtained from conventional storage sites and crystallite surface storage sites.

7. The hydrogen storage material of claim 1, wherein said density of storage sites are obtained from conventional storage sites, crystallite surface storage sites and defect storage sites.

8. An improved high capacity hydrogen storage material formed from an alloy is selected from the group consisting of:

alloys represented by the formula $ZrMn_wV_xM_yNi_z$, where M is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z \leq 1.5$, and $2.0 \leq w+x+y+z \leq 2.4$;

alloys corresponding substantially to the formula $LaNi_5$ in which one of the components La or Ni is substituted by a metal M selected from Groups Ia, II, III, IV, and Va of the Periodic Table of the Elements other than lanthanides, in an atomic proportion which is higher than 0.1% and lower than 25%;

alloys having the formula $TiV_{2-x}Ni_x$, where x=0.2 to 0.6;

alloys having the formula $Ti_aZr_bNi_cCr_dM_z$, where M is Al, Si, V, Mn, Fe, Co, Cu, Nb, Ag, or Pd, $0.1 \leq a \leq 1.4$, $0.1 \leq t \leq 1.3$, $0.25 \leq c \leq 1.95$, $0.1 \leq d \leq 1.4$, a+b+c+d=3, and $0 \leq x \leq 0.2$;

alloys having the formula $ZrMo_dNi_e$ where d=0.1 to 1.2 and e=1.1 to 2.5;

alloys having the formula $Ti_{1-x}Zr_xMn_{2-y-z}Cr_yV_z$ where $0.05 \leq x \leq 0.4$, $0 \leq y \leq 1.0$, and $0 < z \leq 0.4$;

alloys having the formula $LnM_5$ where Ln is at least one lanthanide metal and M is at least one metal chosen from the group consisting of Ni and Co;

alloys comprising at least one transition metal forming 40–75% by weight of said alloys chosen from Groups II, IV, and V of the Periodic System, and at least one additional metal, making up the balance of said electrochemical hydrogen storage alloy, alloyed with the at least one transitional metal, this additional metal chosen from the group consisting of Ni, Cu, Ag, Fe, and Cr—Ni steel, and alloys comprising a main texture of an Mm—Ni system; and a plurality of compound phases where each compound phase is segregated in the main texture, and wherein the volume of each of the compound phases is less than about 10 $\mu m^3$; said improvement comprising in combination:

the crystallite size is less than 200 Angstroms.

9. The hydrogen storage material of claim 8, wherein the crystallite size is less than about 100 Angstroms.

10. The hydrogen storage material of claim 9, wherein said material is an electrochemical electrode.

11. The hydrogen storage material of claim 9, wherein said material is a gas phase hydrogen storage material.

12. A hydrogen storage material, said material characterized by a hydrogen storage capacity created by non-conventional hydrogen storage sites as well as conventional hydrogen storage sites, whereby said non-conventional hydrogen storage sites substantially contribute to the total hydrogen storage capacity of the alloy.

13. The hydrogen storage material of claim 12, wherein said non-conventional hydrogen storage sites contribute to at least 5% of the total hydrogen storage capacity of the material.

14. The hydrogen storage material of claim 13, wherein said non-conventional hydrogen storage sites contribute to at least 10% of the total hydrogen storage capacity of the material.

15. The hydrogen storage material of claim 14, wherein said non-conventional hydrogen storage sites contribute to at least 20% of the total hydrogen storage capacity of the material.

16. The hydrogen storage material of claim 15, wherein said non-conventional hydrogen storage sites contribute to at least 33% of the total hydrogen storage capacity of the material.

17. The hydrogen storage material of claim 16, wherein said non-conventional hydrogen storage sites contribute to at least 50% of the total hydrogen storage capacity of the material.

18. The hydrogen storage material of claim 12, wherein said non-conventional hydrogen storage sites are created by rapidly solidifying a molten material and thereafter grinding the solidified material to a powder.

19. The hydrogen storage material of claim 18, wherein said molten material is a molten hydride forming alloy material.

20. The hydrogen storage material of claim 19, wherein said hydride forming alloy is a stoichiometric TiNi alloy.

21. The hydrogen storage material of claim 20, wherein said hydride forming alloy includes both hydride-forming elements and modifier elements.

22. The hydrogen storage material of claim 19, wherein said hydride forming alloy is a non-stoichiometric TiNi alloy.

23. The hydrogen storage material of claim 22, wherein said hydride forming alloy includes both hydride-forming elements and modifier elements.

24. The hydrogen storage material of claim 23, wherein said hydride forming alloy includes hydride-forming elements selected from the group consisting of Ti, V, Zr and mixtures or alloys thereof and modifier elements selected from the group consisting of Ni, Cr, Co, Mn, Mo, Nb, Fe, Cu, Sn, Ag, Zn, Pd and mixtures or alloys thereof.

25. The hydrogen storage material of claim 24, wherein said material further includes at least one glass forming element selected from the group consisting of Al, B, C, Si, P, S, Bi, In, and mixtures or alloys thereof.

26. The hydrogen storage material of claim 19, wherein said hydride forming alloy is a stoichiometric $LaNi_5$ alloy.

27. The hydrogen storage material of claim 26, wherein said hydride forming alloy includes both hydride-forming elements and modifier elements.

28. The hydrogen storage material of claim 27, wherein said hydride forming alloy includes hydride-forming elements selected from the group consisting of Sc, Y, La, Ce, Pr, Nd, Sm, Mm and mixtures or alloys thereof and modifier elements selected from the group consisting of Ni, Cr, Co, Mn, Fe, Cu, Sn, Mo, V, Nb, Ta, Zn, Zr, Ti, Hf, W and mixtures or alloys thereof.

29. The hydrogen storage material of claim 28, wherein said material further includes at least one glass forming element selected from the group consisting of Al, B, C, Si, P, S, Bi, In, Sb and mixtures or alloys thereof.

30. The hydrogen storage material of claim 19, wherein said hydride forming alloy is a non-stoichiometric $LaNi_5$ alloy.

31. The hydrogen storage material of claim 30, wherein said hydride forming alloy includes both hydride-forming elements and modifier elements.

32. The hydrogen storage material of claim 31, wherein said hydride forming alloy includes hydride-forming elements selected from the group consisting of Sc, Y, La, Ce, Pr, Nd, Sm, Mm and mixtures or alloys thereof and modifier elements selected from the group consisting of Ni, Cr, Co, Mn, Fe, Cu, Sn, Mo, V, Nb, Ta, Zn, Zr, Ti, Hf, W and mixtures or alloys thereof.

33. The hydrogen storage material of claim 32, wherein said material further includes at least one glass forming element selected from the group consisting of Al, B, C, Si, P, S, Bi, In, Sb and mixtures or alloys thereof.

34. The hydrogen storage material of claim 21, wherein said hydride forming alloy includes hydride-forming elements selected from the group consisting of Ti, V, Zr and mixtures or alloys thereof and modifier elements selected from the group consisting of Ni, Cr, Co, Mn, Mo, Nb, Fe, Cu, Sn, Ag, Zn, Pd and mixtures or alloys thereof.

35. The hydrogen storage material of claim 34, wherein said material further includes at least one glass forming element selected from the group consisting of Al, B, C, Si, P, S, Bi, In, Sb and mixtures or alloys thereof.

36. The hydrogen storage material of claim 12, wherein said material is a compositionally or structurally disordered, multi-component material.

37. The hydrogen storage material of claim 36, wherein said material contains crystallites on the order of less than 200 Å.

38. The hydrogen storage material of claim 37, wherein said material contains crystallites on the order of less than 150 Å.

39. The hydrogen storage material of claim 38, wherein said material contains crystallites on the order of less than 125 Å.

40. The hydrogen storage material of claim 39, wherein said material contains crystallites on the order of less than 100 Å.

41. The hydrogen storage material of claim 40, wherein said material contains crystallites on the order of less than 50 Å.

42. The hydrogen storage material of claim 36, wherein said material is a multi-phase material containing both catalytic phases and hydrogen storage phases.

43. The hydrogen storage material of claim 42, wherein said catalytic phases and said hydrogen storage phases are intimately mixed in close proximity to each other.

44. The hydrogen storage material of claim 12, wherein said material includes substantially no phases which include hydride forming elements but do not form hydride storage sites.

45. The hydrogen storage material of claim 12, wherein said material includes substantially no phases which include hydrides with excessive bond strengths.

46. The hydrogen storage material of claim 12, wherein said material is formed from an alloy is selected from the group consisting of:

alloys represented by the formula $ZrMn_wV_xM_yNi_z$, where M is Fe or Co and w, x, y, and z are mole ratios of the respective elements where $0.4 \leq w \leq 0.8$, $0.1 \leq x \leq 0.3$, $0 \leq y \leq 0.2$, $1.0 \leq z \leq 1.5$, and $2.0 \leq w+x+y+z \leq 2.4$;

alloys corresponding substantially to the formula $LaNi_5$ in which one of the components La or Ni is substituted by a metal M selected from Groups Ia, II, III, IV, and Va of the Periodic Table of the Elements other than lanthanides, in an atomic proportion which is higher than 0.1% and lower than 25%;

alloys having the formula $TiV_{2-x}Ni_x$, where x=0.2 to 0.6;

alloys having the formula $Ti_aZr_bNi_cCr_dM_x$, where M is Al, Si, V, Mn, Fe, Co, Cu, Nb, Ag, or Pd, $0.1 \leq a \leq 1.4$, $0.1 \leq b \leq 1.3$, $0.25 \leq c \leq 1.95$, $0.1 \leq d \leq 1.4$, a+b+c+d=3, and $0 \leq x \leq 0.2$;

alloys having the formula $ZrMo_dNi_e$ where d=0.1 to 1.2 and e=1.1 to 2.5;

alloys having the formula $Ti_{1-x}Zr_xMn_{2-y-z}Cr_yV_z$ where $0.05 \leq x \leq 0.4$, $0 \leq y \leq 1.0$, and $0 < z \leq 0.4$;

alloys having the formula $LnM_5$ where Ln is at least one lanthanide metal and M is at least one metal chosen from the group consisting of Ni and Co;

alloys comprising at least one transition metal forming 40–75% by weight of said alloys chosen from Groups II, IV, and V of the Periodic System, and at least one additional metal, making up the balance of said electrochemical hydrogen storage alloy, alloyed with the at least one transitional metal, this additional metal chosen from the group consisting of Ni, Cu, Ag, Fe, and Cr—Ni steel; and alloys comprising a main texture of an Mm—Ni system; and a plurality of compound phases where each compound phase is segregate In the main texture, and wherein the volume of each of the compound phases is less than about 10 $\mu m^3$.

47. A rapidly solidified hydrogen storage alloy ribbon, said ribbon characterized by a defect density of at least $5 \times 10_{21}$/cc.

48. The rapidly solidified hydrogen storage alloy ribbon of claim 47, wherein said defect density is at least $1 \times 10^{22}$/cc.

49. The rapidly solidified hydrogen storage alloy ribbon of claim 47, wherein said defect density is at least $5 \times 10^{22}$/cc.

50. The rapidly solidified hydrogen storage alloy ribbon of claim 47, further characterized by a crystallite size of less than 200 Å.

51. The rapidly solidified hydrogen storage alloy ribbon of claim 47, further characterized by a multi-phase structure containing both catalytic phases and hydrogen storage phases.

52. A rapidly solidified hydrogen storage alloy, said alloy having a the composition: (Ovonic Base Alloy)$_a$M$_b$ where Ovonic Base Alloy represents an Ovonic alloy that contains 0.1 to 60 atomic percent Ti, 0.1 to 50 atomic percent Zr, 0 1 to 60 atomic percent V, 0.1 to 60 atomic percent Ni, and 0.1 to 56 atomic percent: Cr, as described above;

a is at least 70 atomic percent;

M represents at least one modifier chosen from the group consisting of Co, Mn, Al, Fe, W, La, Mo, Cu, Mg, Ca, Nb, Si, and Hf;

b is 0 to 30 atomic percent;

b>0; and a+b=100 atomic percent;

said alloy being characterized by a 5% greater hydrogen storage capacity than the same material in cast form.

53. The rapidly solidified hydrogen storage alloy of claim 52, wherein said alloy has a 10% greater hydrogen storage capacity than the same material in cast form.

54. The rapidly solidified hydrogen storage alloy of claim 53, wherein said alloy has a 20% greater hydrogen storage capacity than the same material in cast form.

55. The rapidly solidified hydrogen storage alloy of claim 54, wherein said alloy has a 33% greater hydrogen storage capacity than the same material in cast form.

56. The rapidly solidified hydrogen storage alloy of claim 55, wherein said alloy has a 50% greater hydrogen storage capacity than the same material in cast form.

57. The rapidly solidified hydrogen storage alloy of claim 52, wherein said alloy has the composition, in atomic percent: 0.5–2.0% V; 7.0–8.5% Cr; 6.0–8.0% Ti; 20–35% Zr, 0.01–0.5% Fe; 15–25% Mn; 1.5–3.0% Co; 25–40% Ni; and 0.01–2.0% Mg.

* * * * *